July 11, 1944.  A. BARTSCH  2,353,383
BABY HOT PLATE
Filed Oct. 28, 1938
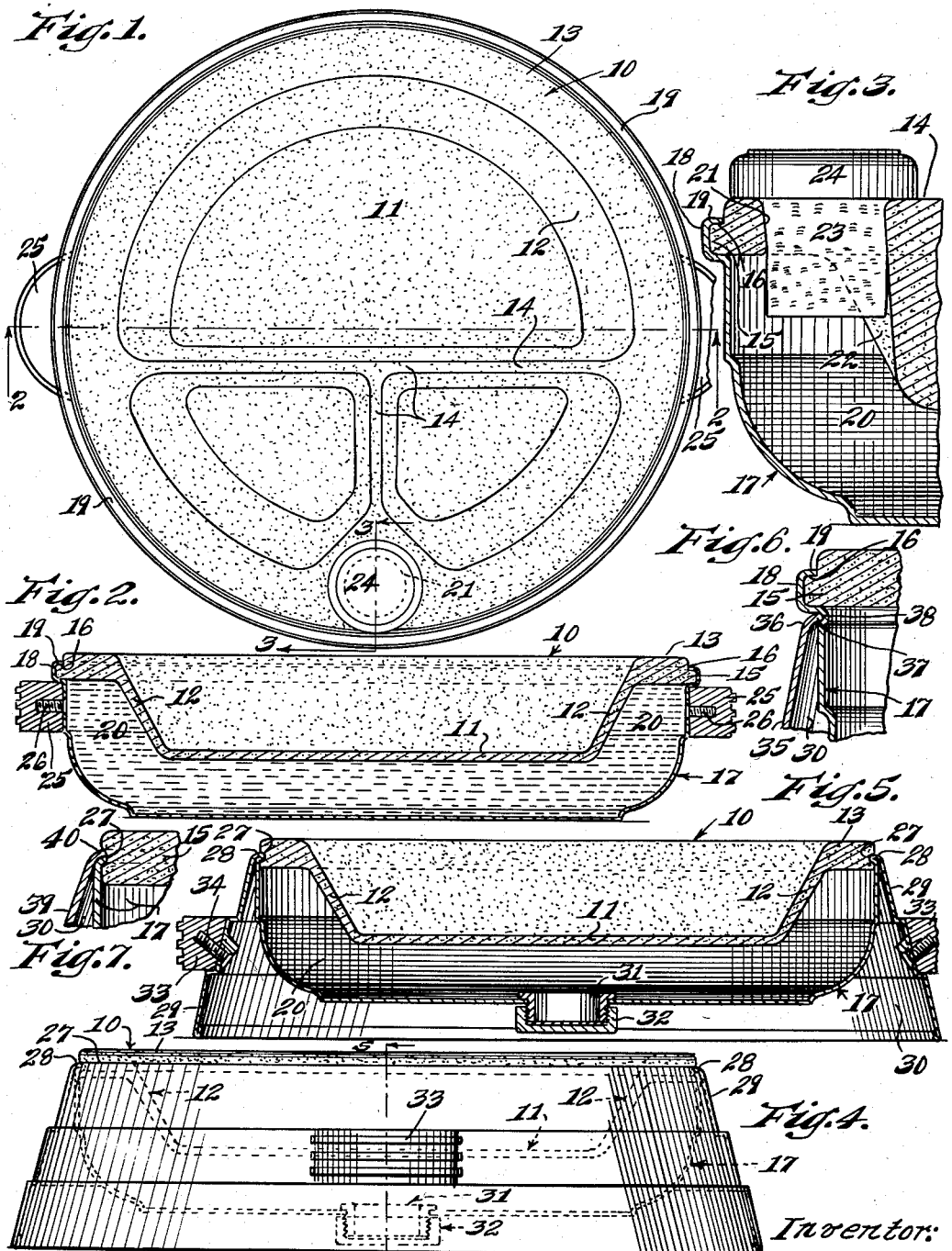
Witnesses:
C. E. Wessels
Aasta E. Mateen
Inventor:
Albert Bartsch,
By Joshua R. H. Potts
his Attorney.

Patented July 11, 1944

2,353,383

UNITED STATES PATENT OFFICE 2,353,383

BABY HOT PLATE

Albert Bartsch, Chicago, Ill.

Application October 28, 1938, Serial No. 237,569

12 Claims. (Cl. 65—15)

This invention relates to a baby hot plate or other dish, bowl or utensil for heating, preparing or serving hot foods or beverages, especially for child use in serving hot cooked or prepared foods or cereals.

The invention has among its important objects to provide a hot plate or utensil, preferably of chinaware or crockery having a hot water chamber or compartment around and beneath the dish or plate and having a hole for filling the same and draining the water therefrom and provided with a stopper or closure cap arranged in a novel position or relation to the plate to avoid projections which interfere with washing and wiping, and also a special outer protective wall, shell of metal insulation or non-conducting surface so as to prevent the transference of the heat of the water at points where the hands are likely to come in contact therewith, thus preventing burns, and in joining a metallic shell to the plate, dish or bowl with or without an outer protective shell, in such a manner that the rim or joint is free of projecting flanges and the rim so formed as to make a more sanitary joint by eliminating the customary deep internal groove on the top of the plate in which contaminating food or other foreign matter may collect and cannot be entirely removed or even partially removed except by scraping or with much difficulty and is not removed by ordinary washing.

Other objects and advantages will appear and be more fully brought out in the following specification, reference being had to the accompanying drawing, wherein:

Fig. 1 is a plan view of the invention;

Fig. 2 is a diametrical sectional view thereof, taken on line 2—2 of Fig. 1;

Fig. 3 is an enlarged fragmentary section;

Fig. 4 is a side elevation of another form of the plate;

Fig. 5 is a diametrical section of the plate as shown in Fig. 4, taken on line 5—5 of Fig. 4;

Fig. 6 is a fragmentary sectional view showing an outer protective shell applied to the form shown in Figs. 1, 2 and 3; and Fig. 7 is a view similar to Fig. 6 of the form shown in Figs. 4 and 5 with the protective shell separate from the inner shell.

Referring to the drawing and more particularly to the form shown in Figs. 1, 2 and 3, 10 designates a plate, dish, bowl or utensil which may be of crockery, china, glass, plastic composition, metal or other suitable material, enameled, if desired, having a bottom wall 11 and a side or circumferential wall 12 terminating in a horizontal rim 14 provided with a flange 15 having a groove or seat 16 shown in the form of a recess at the top thereof. A metallic shell 17 open at the top receives the plate thereon and is formed with an annular bead or rib 18 adjacent the edge or rim thereof and has its edge portion 19 bent or clamped by spinning or otherwise into the groove or seat 16. This edge portion, especially where the shell 17 is of sheet metal such as aluminum, stainless steel or other spring metal, may be made removable so as to snap into or out of the seat to facilitate cleaning.

When the dish and shell are connected, the bottom of the dish is spaced from the bottom of the shell and this forms a space 20, chamber or compartment, for hot water beneath and entirely surrounding the plate which may be filled through an opening 21 in the rim 13 or drained therethrough. The plate has a wall 22 at the opening in connection with one of the ribs or partitions 14 forming a serving platter with a plurality of compartments for different food in the form specifically shown. This wall at the opening serves as a seat for a plug or stopper 23 of cork, rubber or the like, preferably having an ornamented Celluloid or other insulated hand piece or head 24. Where the shell is clamped into the seat of the plate, the parts are relatively flush giving a smooth surface, and being flat, no rim or groove above the rim 13 is provided in which food will lodge or to provide a break or abrupt change in the relatively plain surface which will permit food or other foreign matter to contaminate or produce an unsanitary joint, as with prior constructions. Thus, a more sanitary joint is produced at the joint between the outer shell and the dish thus eliminating the customary groove on top of the plate which prevents proper washing or cleaning thereof.

If desired, the plate may be provided at diametrically opposite sides with handles 25 consisting of enameled wood, Bakelite or other suitable material which will form a good insulation, these handles being shown concavo-convex with the concaved sides fitting the shell and fastened as by means of a screw 26 extending through the wall of the shell and into the handle. It is, of course, understood that these handles are secured in position before the shell is fastened to the plate.

In the form shown in Figs. 4 and 5 of the drawing, the plate and shell are practically of the same construction and similar reference characters are applied to corresponding parts. However, in this form, the rim of the plate is provided with a suitable peripheral groove or seat 27 in which the edge of the shell is pressed or turned to form an internal rib 28 to retain the shell in position. If desired, the shell may be turned outwardly to form an outer shell 29 forming an air space 30 between it and the inner shell serving to insulate the outer shell from the heat to prevent burning of the hands. While the outer shell is shown tapered or flared outwardly and stepped or ribbed as well as provided with a bottom bead, it is to be understood that it may be of any other suitable formation. Also, this outer shell may be of some insulating material and separate from the inner shell so as to be applied to the plate after the contents has been heated. The bottom of the inner shell is provided with a neck 31 for filling and draining the hot water space between the plate and the inner shell and may be screw threaded or otherwise formed to take a closure cap 32. In this instance, the closure means is entirely precluded from view or from being touched by a child. Also, handles 33 corresponding to the handles 25 are provided on the outer shell and secured in position by suitable fastening means such as screws 34 illustrated as being upwardly and outwardly at an angle, but I do not wish to be limited to such securing means.

In Fig. 6 of the drawing, the device shown in Figs. 1, 2 and 3 is provided with a separate and removable protective outer shell 35 made separate from the inner shell. While this outer shell may be made in various forms, in order to be separate and removable as above referred to, it is shown curved inwardly as at 36 beneath the flange 15 and bead or rib 18 which forms an annular shoulder around the plate or other utensil, and its edge portion is slightly turned as at 37 to resiliently spring, snap or friction into an external annular groove 38 formed in the inner shell. However, if desired, the groove may be less accentuated or omitted so long as a tight fit is provided to prevent accidental separation of the two parts. However, this is optional and the frictional engagement may be omitted so long as a relatively snug fit is provided to support the utensil in the outer shell or so long as the shoulder of the inner shell, plate or utensil rests on the top edge or rim of the outer shell. In this form, the same as in the form where the outer shell is formed with the inner shell, the air space maintains the outer shell cool and of course, the utensil is set in the same, preferably after the food has been heated.

In the form shown in Fig. 7, an outer shell 39 of corresponding form and purpose is employed, the top edge 40 thereof engaging, snapping, spring or frictioning within the groove or seat 27 which receives the corresponding edge of the inner shell so as to retain the parts in connection for the same purposes as pointed out in connection with Fig. 6. In each instance, a relatively flush, smooth joint or connection is provided to prevent food or other foreign matter lodging therein, thus maintaining the sanitary cndition of the utensil and facilitating washing thereof.

In the use of the device in either one of the forms, the prepared, canned or cooked food is placed in the platter either before or after the space between the same and the inner metallic shell is filled with hot water. Preferably this is done by removing the plug or cap and using a funnel or otherwise, after which the plug, stopper or cap is reapplied. This will not only warm or heat the food, but will maintain the food in such condition, thereby rendering the same more edible. In either of these forms, the handles are preferably attached to the outer shell.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a hot plate of the class described, a food receptacle having a rim with a top wall and a peripheral seat formed therein below the top thereof, a shell having an edge portion frictioned into the seat to form a tight joint and a hot water space between the receptacle and the shell, a filling and draining opening for said space through the top wall of the rim, and a protective outer shell forming a supporting member spaced from the inner shell.

2. A food serving utensil of the class described comprising a dish having a rim and a peripheral seat in the rim below the top face thereof, a metallic shell crimped into the seat and forming a water space between it and the dish, the surfaces at the juncture of the dish and shell and seat being relatively flush.

3. A hot serving utensil of the class described comprising a dish having a rim and peripheral seat in the outer edge of the rim, a metallic shell snapped into the seat and forming a space between it and the dish, the surfaces at the juncture of the dish and shell and seat being relatively flush, the shell having a bottom filling and draining opening and a closure for said opening.

4. A dish for maintaining food at a desired temperature comprising a body of pottery or like material having an annular upper surface, a side wall and a base, a metallic fluid container attached to the pottery body to form a fluid retaining cavity, an annular ridge on the outside of the pottery body below the upper surface, the upper edge of said metallic fluid container being crimped over the annular ridge so that it lies below the upper surface and forms a tight fit with the pottery body out of normal contact with food during use and serving to maintain the container and pottery body in assembled position, said fluid retaining cavity having a filling opening adapted to be closed in use.

5. A hot serving utensil of the class described comprising a dish having a top rim and a peripheral seat therein below the upper edge of the rim, a metallic inner shell snapped into the seat and forming a hot water space between it and the dish, said shell having a side wall below said seat, and an outer shell integrally connected to the upper portion of said side wall and diverging downwardly therefrom to form an insulating space between said shells and to support the dish and the inner shell above a supporting surface.

6. A hot serving utensil of the class described comprising a dish having a top rim and a peripheral groove forming a seat below the upper face of the rim, a metallic inner shell having an edge snapped into said seat and forming a water space between it and the dish, and an outer insulating shell having its upper edge snapped into said seat, and diverging downwardly from the inner shell forming an insulating space between them.

7. A hot serving utensil of the class described comprising a dish having a top rim and a peripheral seat therein below the upper surface of the rim, a metallic inner shell snapped into said seat and forming a hot water space between it and the dish, said shell having an annular seat below the upper edge thereof, and an outer insulating shell having its upper portion snapped into the last said seat, and the adjacent portions of the inner and outer shells diverging downwardly to form an insulating space between them.

8. A dish for maintaining food at a desired temperature, including a food container and a fluid container composed of a different material than that of the food container, and crimped means for permanently securing the fluid container to the food container with the upper edge of the fluid container below the upper surface of the food container to form a tight fit between the containers, said dish having a filling opening.

9. A dish for maintaining food at a desired temperature, including a food container and a fluid container composed of a different material than that of the food container and means for permanently securing the fluid container to the food container with the upper edge of the fluid container below the upper surface of the food container to form a tight fit between said containers, said means including a seat on one of said containers and means on the other container for engaging the same, said dish having a filling opening.

10. A dish for maintaining food at a desired temperature, comprising a food container of pottery, or like material, a metallic fluid container, and securing means for securing the metallic fluid container to the food container at a point below the upper surface of the food container to form a tight fit with the fluid container out of normal contact with the food during use, and serving to maintain the two containers in assembled position, said securing means including a ridge on one of said members and means on the other container engaging over said ridge, said dish having a filling opening.

11. A dish for maintaining food at a desired temperature, comprising a food container of pottery, or like material, a metallic fluid container, and securing means for securing the metallic fluid container to the food container at a point below the upper surface of the food container to form a tight fit with the fluid container out of normal contact with food during use, and serving to maintain said two containers in assembled position, said securing means including a groove in one of said members and means on the other member fitting in said groove, said dish having a filling opening.

12. A hot serving utensil of the class described comprising a dish having a top rim and a peripheral seat therein below the upper surface of said rim, a metallic inner shell snapped into said seat and forming a hot water space between it and the dish, said inner shell comprising a bottom and a side wall, and an outer shell suitably connected to support the dish and inner shell above a supporting surface, said outer shell and the side wall of the inner shell diverging downwardly to form an insulating air space between them.

ALBERT BARTSCH.